Aug. 31, 1926. Re. 16,412
J. L. SCHWARTZ
SALES STIMULATOR BOOK
Original Filed Nov. 28, 1923
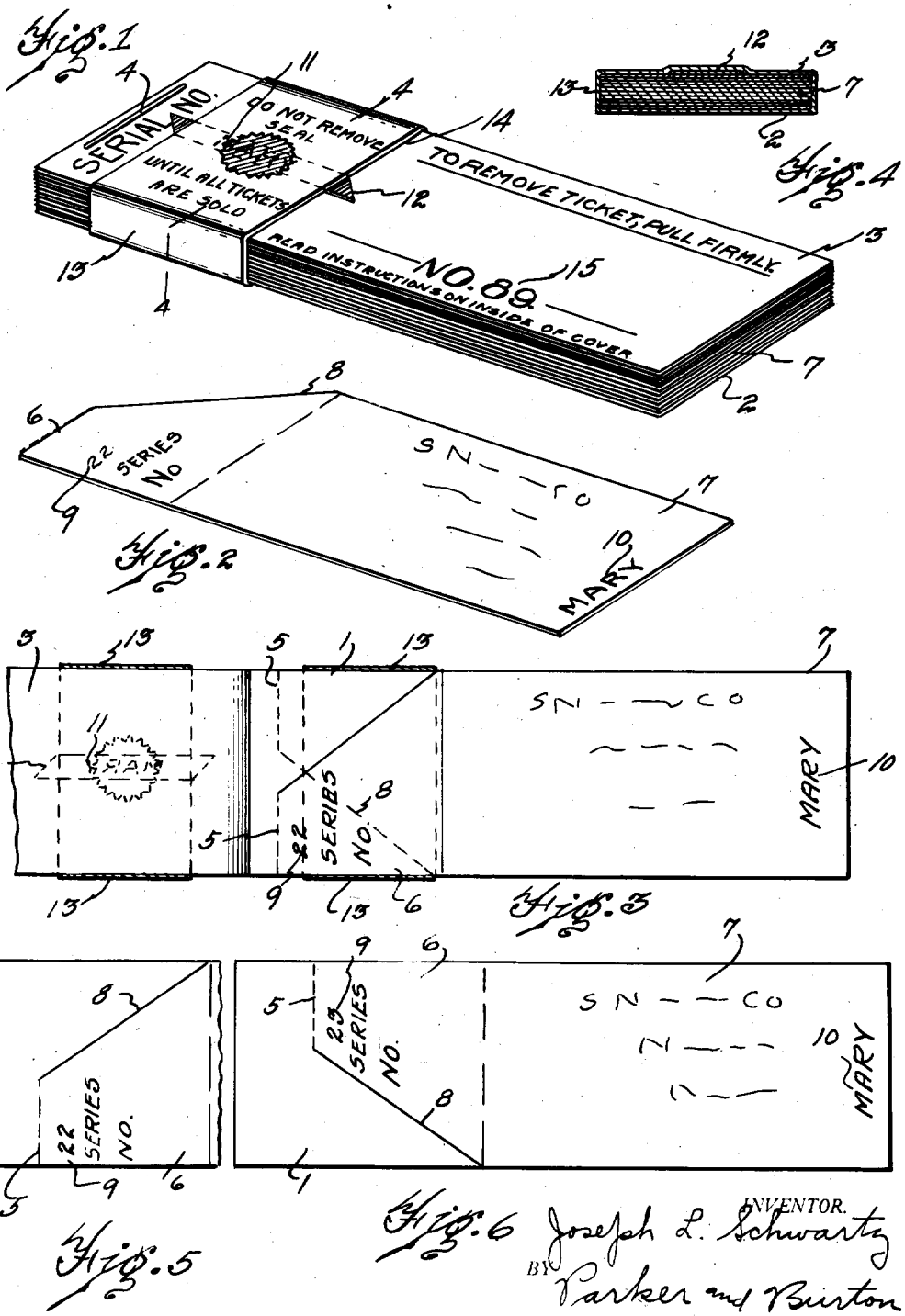
INVENTOR.
Joseph L. Schwartz
BY
Parker and Burton
ATTORNEY.

Reissued Aug. 31, 1926. Re. 16,412

UNITED STATES PATENT OFFICE.

JOSEPH L. SCHWARTZ, OF PHILADELPHIA, PENNSYLVANIA.

SALES-STIMULATOR BOOK.

Original No. 1,494,934, dated May 20, 1924, Serial No. 677,374, filed November 28, 1923. Application for reissue filed May 28, 1925. Serial No. 33,563.

This invention, generally stated, relates to books as used by fraternal, charitable, religious, and other organizations in securing funds for the up-keep and maintenance thereof.

The leading objects of the present invention are to provide a book of this character, calculated to stimulate sales by increasing interest in the project because of the novelty of the plan pursued; calculated to remove all possibility of the winning or prize symbol being discovered prior to complete sale of the book; and further calculated to preclude the possibility of a purchaser knowing in advance the sales price of a ticket to be withdrawn from the book.

A further object of the present invention relates to the providing of a novel arrangement and combination of book-parts for attaining the results sought by said leading objects.

Other and further objects not at this time pointed out will appear hereinafter.

The invention consists of the novel construction hereinafter described and finally claimed.

The nature, characteristic features and scope of the invention will be more fully understood from the following description taken in connection with the accompanying drawings forming part hereof, and in which:—

Fig. 1 is a perspective view of a sales stimulator book embodying features of the invention.

Fig. 2 is a similar view of a ticket and complemental stub part as removed from the book shown in Fig. 1.

Fig. 3 is a top or plan view of the book shown in Fig. 1, with the sealing means broken and the cover folded back to show ticket and stub construction.

Fig. 4 is a view in cross section taken upon the line 4—4 of Fig. 1.

Fig. 5 is a fragmentary view in plan illustrating the uppermost ticket shown in Fig. 3, and Fig. 6 is a similar view of a ticket located immediately below the ticket shown in Fig. 3.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawings in detail, the numeral 1, designates a plurality of stub parts which together with a back 2, and a cover 3, are securely held together as by means of a staple 4. Secured to each stub part 1, for detachable removal along a weakened line 5, is a second stub part 6 having formed integral therewith a ticket 7 which in practice is usually an admission ticket to some function. The stub parts 1, and 6, in manufacture are severed along a diagonal line, as at 8, the line of severing of alternate tickets being in opposed relation, as clearly shown in Fig. 3, the purpose of which will presently appear. Each stub 6, is provided with a ticket sales price as indicated at 9. This sales price is arranged, preferably, immediately adjacent the weakened line 5. It is thus apparent that the sales price of the various stubs 6 are disposed in staggered relation with one another. The purpose of this is to conceal from view the sales price of each ticket prior to the time that such ticket is removed from a book. This is so, because the stub part 1, of one ticket is always over the stub part 6, of a ticket immediately therebelow. Each ticket 7, has printed thereon, as at 10, possible prize indicia which may be a number, name or the like. For the sake of illustration, feminine names have been used in the drawings. In addition to such prize indicia the ticket has printed thereon data denoting the purpose for which the ticket is sold, and which obviously varies according to the use for which it is to be put. The cover 3, has delineated thereon winning prize indicia as indicated by dotted lines in Figs. 1 and 3, and denoted by the numeral 11. This prize indicia is arranged upon that part of the cover 3 immediately above the stub parts 1 and 6. A seal 12, preferably a ribbon or strip of red paper, is placed over the prize indicia 11, and a band 13, secured around the cover, backing and stub parts, as clearly indicated in Figs. 1 and 4. The band 13, thus arranged completely conceals from view the stub parts so that when the flexible cover 3 is folded back along the edge 14, of the band 13, the face only of ticket 7, is discernible. To remove a ticket the purchaser pulls firmly upon the outer end thereof so as to detach same along the weakened line 5. With the ticket removed from the book the purchase price is determined. After all tickets have been sold the band 13, is cut or broken away so that seal 12, may be removed, whereupon the prize winning indicia 11, is clearly discernible. The holder of the ticket having corresponding indicia thereon is the winner of a prize. As an added inducement each book may be provided with a number upon its cover as at 15, and the purchaser pulling a ticket bearing this number as a sales price receives an additional prize.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

The herein described device is not to be confused with lottery or like games of chance because the purchaser of a ticket obtains value received in that said ticket is a means of admission to some frolic, dance, show or entertainment given by an organization. The prizes offered are in addition to this value received. While the price paid for a ticket is not determined until such ticket is withdrawn from the book, the price never exceeds a certain, fixed maximum amount. Further all chance indicia referred to is intended merely as a special award; something in addition to a ticket of admission; perhaps the privilege of joining some organization without further charge.

Having thus described my invention, what I claim as new and desire to secure by Letters Patent, is:—

1. In a sales stimulator book, superimposed leaves each comprising a permanent stub part and a detachable stub part, the latter being provided with a ticket, said detachable stub part bearing a ticket value arranged in staggered relation with respect to the ticket value of a succeeding stub, the permanent stub parts being arranged to conceal from view the price of undetached tickets.

2. A sales stimulator book comprising a plurality of coupons bound together, each coupon consisting of a stub part bearing upon its face a ticket value and having a ticket attached thereto for detachment with said stub part, and a permanent stub part free of said ticket for concealing the ticket value upon a succeeding ticket stub.

3. A sales stimulator book comprising a plurality of coupons bound together, each coupon consisting of a stub part bearing upon its face a ticket value and having a ticket attached thereto for detachment with said stub part, a permanent stub part free of said ticket for concealing the ticket value upon a succeeding ticket stub, and means for maintaining all stubs concealed during a selling period.

4. A sales stimulator book comprising a plurality of coupons bound together, each coupon consisting of a freely detachable stub portion, of which one part is permanent and of which the other part is connected at one end to the permanent part along a weakened line; bears a ticket value; and has attached thereto a ticket, the permanent part serving to conceal from view the ticket value upon a succeeding stub part.

5. A sales stimulator book comprising a plurality of coupons bound together, each coupon consisting of a stub portion divided upon a diagonal line, of which one part is permanent and of which the other part is connected at one end to the permanent part along a weakened line; bears a ticket value; and has attached thereto a ticket, the permanent part serving to conceal from view the ticket value upon a succeeding stub part.

6. A sales stimulator book comprising a plurality of coupons bound together, each coupon consisting of a stub portion divided upon a diagonal line, alternate stub portions having the line of division arranged in opposed directions, of which one part is permanent and of which the other part is connected at one end to the permanent part along a weakened line; bears a ticket value; and has attached thereto a ticket, the permanent part serving to conceal from view the ticket value upon a succeeding stub part.

7. A sales stimulator book having a cover provided with prize indicia thereon, a plurality of coupons detachably secured with respect to said cover said coupons each consisting of a ticket bearing chance indicia and a stub part bearing a ticket value, said stub parts being arranged beneath that portion of the cover bearing the prize indicia, and means for maintaining said stubs and said prize indicia concealed during a selling period.

8. A sales stimulator book having a cover provided with prize indicia thereon, a plurality of coupons detachably secured with respect to said cover, said coupons each consisting of a ticket bearing chance indicia and a stub part bearing a ticket value, said stub parts being arranged beneath that portion of the cover bearing the size indicia, and means including a seal for maintaining the stubs and said prize indicia concealed during a selling period.

9. A sales stimulator book having a cover provided with prize indicia thereon, a plurality of coupons detachably secured with respect to said cover, said coupons each consisting of a ticket bearing chance indicia and a stub part bearing a ticket value, said stub parts being arranged beneath that portion of the cover bearing the prize indicia, a sealing strip arranged over said prize indicia, and a binder secured around said stubs, including said cover and strip, for concealing from view all but the faces of said tickets when the cover is turned back.

10. A sales stimulator book having a flexible cover provided with prize indicia thereon, a plurality of coupons detachably secured with respect to said cover, said coupons each consisting of a ticket bearing chance indicia and a stub part bearing a ticket value, said stub parts being arranged beneath that portion of the cover bearing the prize indicia, and means securing the latter portion of said cover in abutting relation with the stubs for concealing both the stubs and said prize indicia, but permittng of said cover being folded back along the juncture line of a ticket and its stub.

11. In a sales stimulator book, a plurality of tickets each comprising a permanent stub portion and a detachable ticket of admission portion secured thereto along a weakened line, said ticket of admission portion bearing a ticket value arranged in proximity to the said weakened line, a cover secured about the permanent stub portions and about the ticket of admission portions concealing from view the ticket valves appearing thereon, said cover adapted to permit selective withdrawal of individual ticket of admission portions.

12. In a sales stimulator book, a plurality of tickets each comprising a permanent stub portion and a removable ticket of admission portion detachably secured to said stub portion, said ticket of admission portions bearing ticket values, said stub portions bound within a cover which extends beyond the stub portions and conceals the ticket values appearing on the ticket of admission portions so long as the cover is not mutilated, said ticket of admission portions being individually selectively detachable from the cover and the permanent stub portion.

In testimony whereof I sign this specification.

JOSEPH L. SCHWARTZ.